United States Patent Office 2,771,375
Patented Nov. 20, 1956

2,771,375

GLASS-LIKE COMPOSITION AND METHOD FOR MAKING THE SAME

Robert W. Foraker, Metuchen, N. J., assignor to National Lead Company, New York, N. Y., a corporation of New Jersey No Drawing. Application August 26, 1952, Serial No. 306,490

3 Claims. (Cl. 106—49)

This invention relates to titania-opacified enamels. More particularly, it relates to titania-opacified enamels which also contain lead oxide. Still more particularly, this invention relates to low-melting enamels of the type used for decorating glassware, and to means for improving the color and appearance of such enamels.

Glass-decorating enamels in general are well known in the art. Such an enamel is characterized by a relatively low maturing temperature, which is necessary to prevent warpage of the substrate, and by a characteristic coefficient of expansion, which must be carefully matched to that of the substrate glass in order to prevent chipping and spalling or excessive internal stresses during cooling.

Typical formulations for such enamels are based upon lead oxide, silica, soda or potash and boron oxide, to which other substances such as alumina, zirconia, and titania in small amounts may be added to improve the properties of the finished enamel. Over and above the substances just mentioned, which produce a clear enamel frit, it is common practice to have present in the enamel pigments or coloring agents of various kinds, to impart the desired color and opacity to the finished enamel. Among these agents is titania, which is used both as a white pigment and as an opacifier for colored enamels. This use of titania is to be distinguished from its above-mentioned use to influence the characteristics of the matrix; when used as a coloring and opacifying agent, the titania is ordinarily added as $TiO_2$ to the quenched frit and dry-milled with it prior to incorporation of the frit into a suitable vehicle or binder. When titania is used to influence the characteristics of the matrix, on the other hand, it is added to the frit batch before fusion and dissolves to form a clear frit. However despite the fact that titania is appreciably soluble in frit compositions before fusion, it goes into solution rather slowly. It is not expected therefore that when titania is added to a quenched frit (i. e., after fusion) and subsequently fired at ordinary maturing times and temperatures, it does not dissolve to any great extent, and is, therefore, effective as a coloring and opacifying agent.

Difficulty has been experienced with such enamels when they contain both PbO and undissolved $TiO_2$, in that these two substances apparently react to produce colored compounds, and the resulting enamels tend to be off-white and yellowish. This tendency can be partially overcome by use of low curing temperatures, but even at relatively low temperatures these colored compounds are frequently troublesome, the temperature at which they appear depending somewhat upon the history and composition of the frit. Higher temperatures aggravate these undesirable side reactions. The appearance of these colored compounds is not always predictable or controllable, and the occurrence of off-color rejects has consequently been undesirably large.

An object of the present invention, therefore, is to provide an improved enamel composition. A further object is to provide an improved enamel composition which contains titanium dioxide as a coloring and opacifying agent. A still further object is to provide an improved glass enamel composition which contains titanium dioxide as a coloring agent together with lead oxide, and which will not be discolored at ordinary maturing temperatures. An additional object is to provide an improved enamel composition which will not be discolored when matured at temperatures higher than ordinary maturing temperatures. Further objects and advantages will become apparent from the following specification and claims.

In its broadest aspect, this invention contemplates a vitreous enamel composition which contains $TiO_2$ and PbO, at least a portion of said $TiO_2$ being present in an undissolved state, and $P_2O_5$ in amount of at least 0.010 part of $P_2O_5$ for each part of PbO.

In an especially desirable embodiment, this invention contemplates an enamel composition of the above type wherein said $P_2O_5$ is present in amount from 0.010 to 0.10 part $P_2O_5$ for each part of PbO.

The present invention particularly contemplates an improved glass enamel batch comprising silica, boric oxide, alkali, lead oxide, titania and $P_2O_5$, at least a portion of said titania being present in an undissolved state, wherein said $P_2O_5$ is present in amount from 0.010 to 0.10 parts of $P_2O_5$ for each part of PbO.

Basic formulations of the type comprising silica, alkali, boric oxide and lead oxide are well-known to the art, and substantially any of these known formulations may be successfully employed in the practice of the present invention. Typical formulations, and those which are preferred for economy, maturing properties, ease of handling, and compatibility with the composition and expansion characteristics of most substrates, are those which contain from 45 to 65 percent PbO, from 20 to 40 percent $SiO_2$, from 0 to 8 percent of alkali, which may be $Li_2O$, $Na_2O$, $K_2O$, or mixtures thereof, from 0 to 8 percent $B_2O_3$, and from 0 to 9 percent of $TiO_2$ (dissolved $TiO_2$). Other mineral constituents, such as $ZrO_2$, $Al_2O_3$, fluorides and the like, may also be incorporated, if desired, in accordance with the ordinary formulation techniques known to the art. Throughout this specification all of the parts and percentages used are expressed as being on a weight basis.

The amount of $TiO_2$ employed as a coloring agent will depend partially on the solubility of $TiO_2$ in the enamel formulation selected, since formulations in which $TiO_2$ is highly soluble will tend to dissolve a portion of the $TiO_2$ and thus reduce its effectiveness as an opacifier. The upper limit of $TiO_2$ employed will also depend upon the degree of opacity desired in the finished enamel, as well as upon the surface texture desired, in that very highly-pigmented enamels will tend to exhibit a matte finish. Typical formulations employ from 5 to 10 weight percent of $TiO_2$ in the batch for pigmentation.

The amount of $P_2O_5$ employed is dependent upon the quantity of PbO in the formulation and varies uniformly although not stoichiometrically. It has been found that optimum results are achieved when the amount of $P_2O_5$ is from about 0.010 to about 0.10 part for each part of PbO. Smaller amounts of $P_2O_5$ may be used with correspondingly diminished effect, while larger amounts than those stated may be used but do not contribute any further to color stabilization, and may tend to produce matte finishes. To insure that sufficient $P_2O_5$ is present to produce a white enamel under any circumstances and still avoid the use of uneconomically large amounts thereof, it is preferred to maintain the $P_2O_5$ content between 0.02 and 0.04 part for each part of PbO present.

The $P_2O_5$ values may be added to the batch in any convenient way but are preferably incorporated into the frit batch to assure homogeneity and avoid possible localized reactions of PbO and $TiO_2$ to produce a mottled discoloration.

The $P_2O_5$ values need not, of course, be added as such, but are expressed as the oxide in accordance with the usual convention of the art. In practice it is usual to incorporate the phosphorus values in the form of phosphates of one or more of the metals constituting the frit batch, for example, by adding a portion of the soda as sodium phosphate or a portion of the lead as lead phosphate. If desired, the $P_2O_5$ values may also be introduced with the titanium in the form of titanium phosphate, when titania is present in the frit batch. The other oxides constituting the batch may also be supplied in forms other than that of the pure oxide. $B_2O_3$ is ordinarily added in the form of borax (sodium tetraborate) or other borates, the alkali metals may be added as hydroxides, borates, phosphates, carbonates and the like, depending on the demands of the formulation. Similarly, titanium values may be added as $TiO_2$, sodium titanate, etc.

The maturing temperature of the enamel batch will depend upon the particular formulation selected, and will not be materially altered by the presence of the $P_2O_5$, except in that the presence of $P_2O_5$ in amounts according to the present invention will allow higher maturing temperatures to be used if such is desired, without adversely affecting the color or properties of the finished enamel. This is illustrated in the examples, where an enamel containing $P_2O_5$ according to the present invention could be matured successfully at any temperature between 550 and 600° C., whereas a similar enamel which did not contain $P_2O_5$ was discolored when matured at 550° C.

In order to further illustrate the nature and operation of the present invention, the following examples are presented:

Example I

An enamel frit batch was prepared according to the following formulation:

| | Parts |
|---|---|
| $Pb_3O_4$ | 200 |
| $SiO_2$ | 88.2 |
| $Na_2CO_3$ | 27.7 |
| $H_3BO_3$ | 13.4 |
| $TiO_2$ | 12.0 |
| $ZrO_2$ | 11.2 |
| $NaH_2PO_4H_2O$ | 4.2 |

Expressed on the oxide basis, this formulation corresponds to the following:

| | Percent |
|---|---|
| PbO | 58.5 |
| $SiO_2$ | 26.4 |
| $Na_2O$ | 5.1 |
| $B_2O_3$ | 2.3 |
| $TiO_2$ | 3.6 |
| $ZrO_2$ | 3.4 |
| $P_2O_5$ | 0.7 |

It will be noted that the weight ratio $P_2O_5$/PbO in the foregoing composition was approximately 0.012.

A frit was prepared from this batch by the customary method which consists of dry-mixing the ingredients, smelting (for ½ hour at 1100° C.) and quenching the molten mass in water. A clear, colorless, granular frit was thereby obtained. This quenched frit was then mixed with 5 percent of its weight of white titanium oxide pigment and ball-milled to form a finely-divided, uniformly-pigmented enamel batch composition. This composition was blended with a 10 percent aqueous solution of medium viscosity hydroxy-ethyl cellulose in amount sufficient to produce a workable fluid mix, and applied to a glass panel. The panel was fired at 600° C. for 25 minutes to mature the enamel, and then annealed by cooling to below 200° C. at a rate of about 50° per hour. The panel was then allowed to cool to room temperature and examined. The enamel coating was smooth, opaque, and glossy, with no tendency to check or craze, and was in every respect a good quality enamel finish. The color was pure white with a slight bluish tone.

In order to compare these results with those obtained using a similar frit containing no phosphate, a frit was prepared according to the formulation above, but substituting 1.4 parts of additional $Na_2CO_3$ for the 4.2 parts of $NaH_2PO_4H_2O$, so that all the oxide components of the frit were present in the same relative proportions, except that $P_2O_5$ was absent. The resulting frit was pigmented, ground, applied to a glass panel, matured and annealed in the same way as described above. This phosphate-free enamel was substantially similar to the first enamel, except that it had a decidedly yellow color tone.

Example II

Another glass panel was coated with the phosphate-containing enamel of Example I and was processed in substantially the same way, except that it was matured for 25 minutes at 550° C. It was then annealed as described in Example I. It was found to have a low-gloss finish, indicating that maturing was slightly less than optimum. The color was substantially identical with that of the phosphate-containing enamel of Example I, and the finish was of good quality.

For purposes of comparison, the phosphate-free comparison enamel of Example I was also applied to another glass panel, matured at 500° C. and annealed along with the phosphate-containing enamel just described. The resulting enamel was again slightly under-matured, but the color was greatly improved, when compared with the same phosphate-free enamel matured at 600° C. Nevertheless, it was still slightly discolored and noticeably inferior to the phosphate-containing enamels in this respect.

Example III

Another frit composition was prepared using the following ingredients:

| | Parts |
|---|---|
| $Pb_3O_4$ | 160.6 |
| $SiO_2$ | 54.0 |
| $Na_2CO_3$ | 3.6 |
| $H_3BO_3$ | 9.4 |
| $TiO_2$ | 8.0 |
| $Al_2O_3$ | 8.2 |
| $NaH_2PO_4H_2O$ | 30.4 |

When expressed on the oxide basis, this frit had the following composition:

| | Percent |
|---|---|
| PbO | 61.0 |
| $SiO_2$ | 21.1 |
| $Na_2O$ | 3.5 |
| $B_2O_3$ | 2.0 |
| $TiO_2$ | 3.1 |
| $Al_2O_3$ | 3.2 |
| $P_2O_5$ | 6.1 |

In this case it will be noted that the weight ratio $P_2O_5$/PbO was approximately 0.10.

This frit batch was smelted and quenched in the normal manner, ball-milled together with 8 percent of its weight of $TiO_2$ pigment, and incorporated into the same vehicle described in Example I.

The resulting pigmented mixture was applied to a glass panel and matured for 25 minutes at 530° C., annealed as in Example I, cooled and examined. The enamel was smooth, continuous, opaque and glossy, and was bright blue-white in color.

A similar frit was prepared using 10.6 parts of additional $Na_2CO_3$ instead of the 30.4 parts of $NaH_2PO_4H_2O$, and was processed along with the phosphate-containing enamel of the present example. The resulting finish was again of good quality but had a muddy yellow tint.

Enamel compositions prepared according to the present invention are of equal quality in substantially all respects with phosphate-free enamels of comparable formulation. They are equal or better in opacity when compared to phosphate-free enamels, and possess improved brightness and tone. While they are capable of being matured at substantially the same temperatures as are commonly used for the phosphate-free enamels, they are also capable of being matured, if desired, at materially higher temperatures without impairment of their brightness, opacity, or color-tone, wherein they represent a marked improvement over the phosphate-free enamels heretofore employed.

While this invention has been described and illustrated by the examples shown, it is not intended to be limited thereto and other modifications and variations may be employed within the scope of the following claims:

I claim:

1. In a $TiO_2$ opacified vitreous enamel composition prepared by maturing a mixture of a frit composition and $TiO_2$ as an opacifying agent, said frit composition containing from 45 to 65 percent PbO, from 20 to 40 percent $SiO_2$, from 0 to 8 percent alkali selected from the group consisting of $Li_2O$, $Na_2O$, $K_2O$ and mixtures thereof, from 0 to 8 percent $B_2O_3$, and from 0 to 9 percent dissolved $TiO_2$, all of the percentages being weight percents, the improvement which consists in having present in said frit composition from 0.01 to 0.1 part by weight of $P_2O_5$ for each part of PbO contained therein.

2. A vitreous enamel composition according to claim 1 in which said frit composition contains from 0.02 to 0.04 part by weight of $P_2O_5$ for each part of the PbO contained therein.

3. A vitreous enamel composition according to claim 1 in which said $TiO_2$ added as an opacifying agent is present in the undissolved state in amount from 5 to 10 percent by weight of said composition.

References Cited in the file of this patent

UNITED STATES PATENTS

| | | |
|---|---|---|
| 2,278,868 | Deyrup | Apr. 7, 1942 |
| 2,397,004 | Harbert et al. | Mar. 19, 1946 |
| 2,397,005 | Harbert et al. | Mar. 19, 1946 |
| 2,556,896 | Beatty et al. | June 12, 1951 |